SIGNAL PEAK DETECTION SYSTEM

Filed Oct. 27, 1967

INVENTORS.
CLIFFORD J. BADER
RICHARD L. FUSSELL
BY
Francis A. Varallo
AGENT

United States Patent Office 3,546,482
Patented Dec. 8, 1970

3,546,482

SIGNAL PEAK DETECTION SYSTEM

Clifford J. Bader, West Chester, and Richard L. Fussell, Chester Springs, Pa., assignors to Burroughs Corporation, Detroit, Mich., a corporation of Michigan

Filed Oct. 27, 1967, Ser. No. 679,965
Int. Cl. H03k *5/20*
U.S. Cl. 307—235 9 Claims

ABSTRACT OF THE DISCLOSURE

The present disclosure deals with a peak detector utilizing solid state electronic devices and being capable of receiving an input signal of varying amplitude and of generating an output signal in the nature of a pulse or DC level transition indicative of the passage of said input signal through its peak absolute amplitude.

SUMMARY OF THE INVENTION

In accordance with the invention described and claimed herein, an electrical signal whose amplitude peak is to be detected is applied both in-phase and phase-inverted to the respective input terminals of the pair of current amplifying stages which comprise the basic peak detector circuit. A regenerative detector circuit also described hereinafter uses an additional stage. By virtue of the capacitive coupling and the push-pull drive, the peak detector produces a level transition when the absolute amplitude of the input derived from the electrical signal information begins to decline after passing through a maximum value. The amount of over-the-peak drop required for the particular application determines the system threshold level. The present peak detection system is characterized in that it is capable of operation over a wide temperature range, has extremely low power requirements, involves minimal cost, and possesses a long, untended service life with high reliability.

DESCRIPTION OF THE PREFERRED EMBODIMENTS

Figure 1:
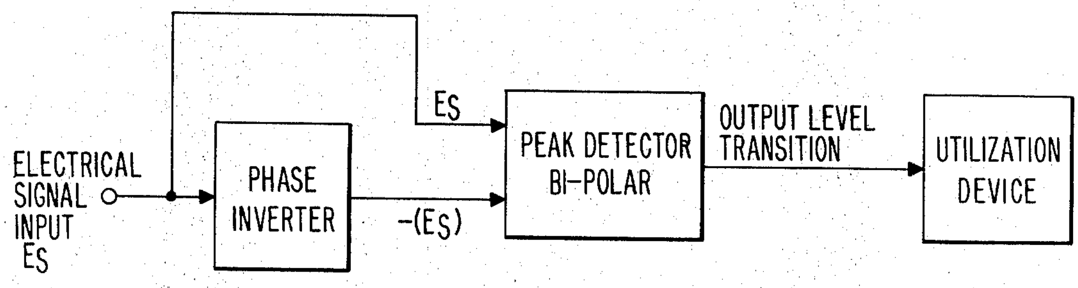
FIG. 1 is a block diagram of the signal peak detection system organization.

The peak detection system organization is illustrated in block form in FIG. 1. The input electrical signal, designated $E_S$, whose amplitude peak is to be detected is shown coupled to a phase inverter and to one of the input terminals of the peak detector. The phase-inverted signal output from the inverter, designated $-(E_S)$, derived from the input signal is coupled to the other terminal of the peak detector. It should be understood that if the source itself, of input signal $E_S$, provides the push-pull drive required by the phase detector, the phase inverter is unnecesary and can be eliminated. If a phase inverter circuit must be used, numerous varieties of this circuit, well known to those skilled in the electronic art, may be successfully employed. It has been found, for example, that the use of a stabilized, feedback-type, unity gain, inverting amplifier is particularly advantageous because of the inherent low output impedance and stability of such a configuration.

An output level transition on the output terminal of the peak detector is indicative of the occurrence of the peak absolute amplitude of the input signal. Such voltage level transition is coupled to a utilization device. It should be noted that in some applications, the utilization device may present a high load requirement. If this be the case, an amplifier may be necessary to couple the output voltage level transition from the peak detector to the load. Although for simplicity, such an amplifier is not shown in the block diagram of FIG. 1 (and is also not illustrated in the remaining figures), it should be understood that such amplifier or amplifiers, which are well within the skill of the electronic circuit designer, may be provided if the particular application so warrants.

Figure 2:
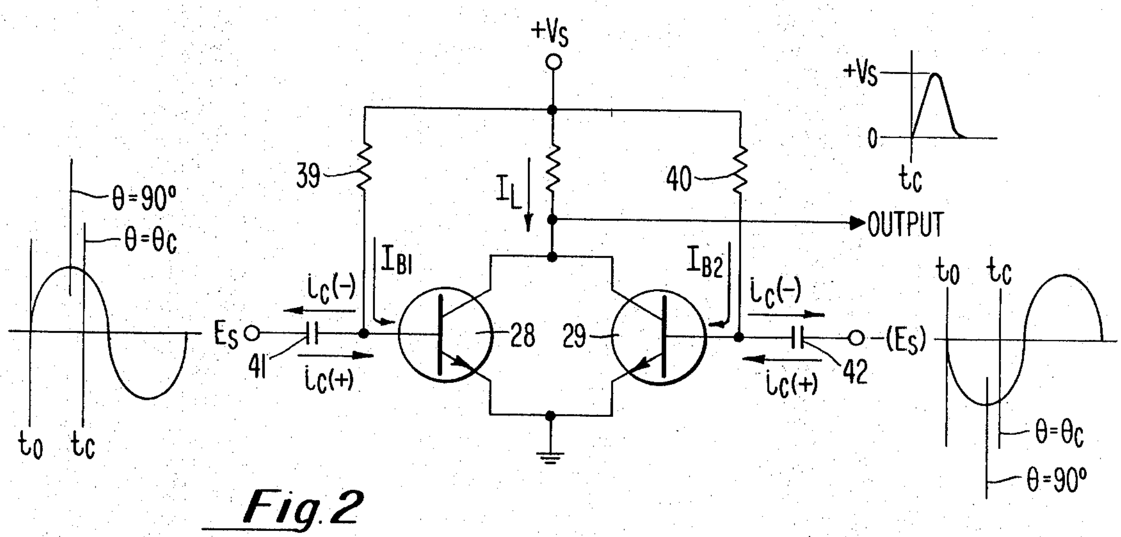
FIG. 2 is a schematic circuit diagram of a peak detector circuit employed in the system.

A peak detector circuit without regenerative action is depicted in FIG. 2. The action of the peak detector is as follows. Transistor 28 is adapted to receive the input signal $E_S$ which is coupled to the base of transistor 28 by way of capacitor 41. Similarly, transistor 29 of the peak detector is adapted to receive by way of capacitor 42, the inverse signal $-(E_S)$. When an input signal $E_S$ of polarity such that a positive-going voltage appears on the base of transistor 28, which transistor was initially saturated by the current through resistor 39, transistor 28 assumes a greater degree of conduction due to capacitor current, $i_c(+)$. The common collector voltage does not change significantly from the initial level of approximately $1/10$ volt. Simultaneously, however, the base of transistor 29 receives a negative-going signal $-(E_S)$ by way of capacitor 42 and the capacitor current $i_c(-)$ tends to oppose the current flow, $I_{B2}$ through resistor 40, thereby causing transistor 29 to cease conduction. As the signal amplitude increases, capacitor 41 charges through the low base resistance of transistor 28 while capacitor 42 sees only the current through resistor 40 and cannot charge significantly. At the peak of the signal, where $\theta=90°$, the current in capacitor 41 drops to zero, and transistor 28 returns to its initial saturation level. At the same time, transistor 29 is biased off by nearly the full negative voltage excursion of $-(E_S)$.

When the signal amplitude of $E_S$ begins to fall, capacitor 41 begins to discharge and the resultant current $i_c(-)$ opposes $I_{B1}$ through resistor 39. As the former current increases, transistor 28 ceases to be saturated and, when the two currents $i_c(-)$ and $I_{B1}$ are equal, transistor 28 cuts off. Capacitor 42 is selected to have a value such that the charge remaining thereon causes transistor 29 to remain in a nonconducting state even when signal $-(E_S)$ starts its positive-going excursion. When both transistors 28 and 29 cease conduction, the voltage on the common collector point of these transistors rises toward $+V_S$ and an output signal indicative of the passage of the peak absolute amplitude of the input signal $E_S$, appears on the common collectors of transistors 28 and 29.

Summarizing the design of criteria for the peak detector of FIG. 2 at a time prior to $t_0$, in the absence of information signals $E_S$ and $-(E_S)$, steady state conditions are in effect. Thus:

$$i_c \text{ (the capacitor current)} = 0$$

$$I_{B1} \text{ and } I_{B2} \geq \frac{I_L/2}{\beta}$$

where $I_{B1}$ and $I_{B2}$ are the base currents of transistors 28 and 29 respectively; $I_L$ is the common collector current; and $\beta$ is the transistor "beta."

As $E_S$ and $-(E_S)$ are applied to the detector at a time $t$ greater than $t_0$ and where $\theta<90°$;

$$i_c(-) > I_{B2}$$

which implies that transistor 29 is approaching or has reached cut off. In accordance with the basic relationship that $$i_c \text{ (the capacitor current)} = \frac{Cd_V}{dt}$$

this requires that $$\left| C42 \frac{d-(E_S)}{dt} \right| > I_{B2}$$

As a practical matter, it is necessary that the left hand quantity above be several times as large as $I_{B2}$ to insure that transistor 29 remain cut off at time $t_c$ when transistor 28 is also cut off. Thus, at a time when $\theta > 90°$, $$I_{B2} < i_c(-)$$

when:

$\theta = \theta_c$ at time $t_c$,
$i_c(-) > I_{B1}$ and transistor 28 is driven to cut off. This requires that $$\left| C41 \frac{d(E_S)}{dt} \right| > I_{B1}$$

Since both transistors 28 and 29 are now cut off at time $t_c$, an output signal is generated on the common collectors thereof, as explained hereinbefore.

Figure 3:
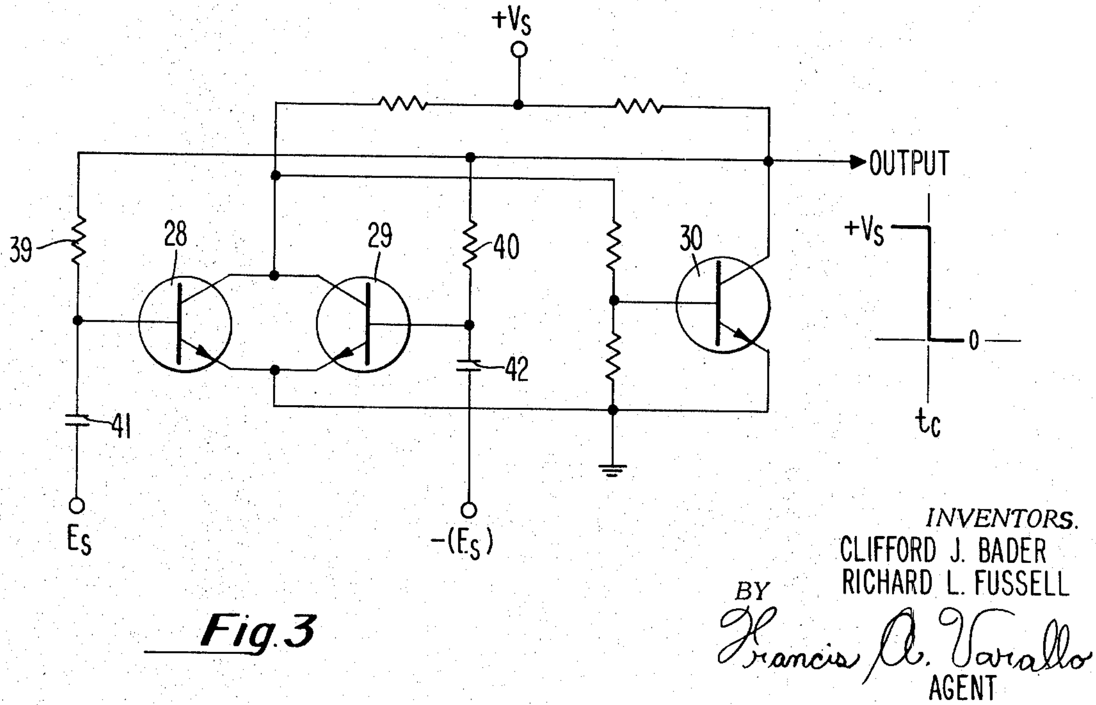
FIG. 3 illustrates a second form of peak detector which differs from that of FIG. 2 in that it operates in a regenerative manner.

In FIG. 3, the connection of resistors 39 and 40 to the collector electrode of transistor 30 provides a regenerative action in the peak detector. As transistor 28 begins to cut off and transistor 30 turns on, the current through resistor 39 is reduced to essentially zero. Thus, the transition from partial to full cutoff is extremely rapid and the rise time of the leading edge of the output waveform is considerably less than that produced without the regenerative action.

The threshold amplitude for which an output level transition is generated is determined by a combination of factors. Different effects predominate at different frequencies. The useful frequency range (±3 db threshold) is somewhat greater than a decade.

At the low frequency range, the threshold is determined by the relationship *Cdv/dt* required to absorb the current flowing through resistor 39.

At midrange, the threshold determination results from the required saturation-to-cutoff, transistor 28 to transistor 29, base voltage transition, which is typically 30 millivolts.

In the high frequency range, phase shift in the network consisting of the base resistance of transistor 28 and the capacitance of capacitor 41 causes the peak signal as seen by transistor 28 to lag behind the actual peak. The waveform at transistor 29 is not shifted however, because the time constant of resistor 40, capacitor 42 is very long. Thus, transistor 29 tends to return to conduction before transistor 28 is cut off unless the signal amplitude is increased above the midrange threshold level.

It is apparent therefore, that the circuit of FIGS. 2 and 3 is a true "peak detector" only for amplitudes well above the threshold. With amplitudes near the threshold, it is more accurately an "over-the-peak" detector, which condition provides sufficient localization for most applications.

The peak detector operation described hereinbefore assumed that a positive-going signal was applied to transistor 28. It is obvious that the circuit action for a negative-going signal applied to the last-mentioned transistor is identical except that the behavior of transistors 28 and 29 is interchanged.

It should be noted that the side of the peak detector to which a positive-going signal is applied, presents a low impedance to the driving source, by virtue of the input impedance of a saturated grounded-emitter transistor. The side of the detector receiving the negative-going signal presents a very high impedance, equal for example to the value of resistor 40, because the associated transistor is cut off. It is therefore desirable that the source driving the detector circuit have a low output impedance, of the order of 100 ohms or less, but current-driving capability is needed only when the signal is going in the positive direction. An NPN emitter follower with low static current drain has been found to be a suitable source.

It should be apparent from the foregoing description of the invention and its mode of operation that there is provided an improved peak signal detection system. The circuit performs its function of locating the signal peak with a degree of accuracy satisfactory for most applications. It is extremely simple, highly reliable, and performs over a wide temperature range. The total current drain is on the order of 20 microamperes.

It should be understood that modifications of the arrangements described herein may be required to fit particular operating requirements. For example the peak detector performance can be improved at the expense of additional circuit components by isolating the collector electrodes of transistors 28 and 29 from each other by buffer stages, in order to improve threshold symmetry and the frequency response.

Other modifications similar to the foregoing may suggest themselves to those skilled in the art. The present invention is not considered limited to the embodiment chosen for purposes of disclosure and covers all changes and modifications which do not constitute departure from the true scope of this invention. Accordingly, all such variations as are in accord with the principles discussed previously are meant to fall within the scope of the appended claims.

What is claimed is:

1. A signal peak detection system for detecting the peak absolute amplitude of an input push-pull electrical signal comprising a peak detector having a pair of current amplifying stages coupled to each other, a pair of capacitors each having first and second terminals, the first terminals of said capacitors being connected respectively to the in-phase and phase-inverted forms of said input signal, said second terminals of said capacitors being connected respectively to said peak detector current amplifying stages, said stages being normally in a conducting state in the absence of said electrical signal, the degree of conduction of said peak detector current amplifying stages being a function of the respective instantaneous amplitudes of said in-phase and phase-inverted forms of said electrical signal and the electrical charges on the capacitors associated therewith, the in-phase form of said input signal initially causing increased conduction in a first of said pair of stages and the charging of its associated capacitor, the phase-inverted form of said input signal concurrently causing the second of said stages to cease conduction, the occurrence of the maximum absolute amplitude of said input signal resulting in the return of the first of said stages to its normal state of conduction and the subsequent discharge of its associated capacitor, whereby said last mentioned stage is driven to a nonconducting state, both said peak detector stages being nonconductive at this time, said peak detector generating a voltage level transition in response to the coincident cessation of current flow in said stages.

2. A signal peak detection system as defined in claim 1 wherein said peak detector further includes a third current amplifying stage coupled to said pair of stages, said third stage being normally nonconductive and being driven to conduction in response to the diminution of current flow in the first of said stages following the occurrence of the maximum absolute amplitude of said input signal, the conduction of said third stage providing a regenerative action whereby current flow in the first of said stages is caused to diminish rapidly, said third stage providing an output signal exhibiting a fast rise time leading edge waveform as a consequence of said regenerative action.

3. A signal peak detection sytem as defined in claim 1 wherein each of said current amplifying stages has an input, an output and a control electrode, said second terminals of said capacitors being connected respectively to the control electrodes of said stages, the input electrodes of said stages being connected in common to a source of reference potential, impedance means for coupling the common-connected output electrodes of said stages to a source of supply potential, first and second impedance means for coupling respectively the control electrodes of the first and second of said stages to said source of supply potential, the peak detector output signal represented by said voltage level transition appearing on said common-connected output electrodes of said current amplifying stages.

4. A system as defined in claim 3 wherein said current amplifying stages are transistors.

5. A system as defined in claim 4 wherein said transistors are of the silicon, NPN conductivity type.

6. A signal peak detection system for detecting the peak absolute amplitude of a push-pull electrical signal comprising a peak detector including first and second transistors, each transistor having an emitter, a collector, and a base electrode, a pair of capacitors each having first and second terminals, the first terminals of said capacitors being connected respectively to the in-phase and the phase-inverted forms of said electrical signal, said second terminals of said capacitors being connected respectively to the base electrodes of said first and second transistors, said base electrodes of said last mentioned transistors being coupled respectively to a source of supply potential, the emitter electrodes of said first and second transistors being connected in common to ground potential, impedance means coupling in common the collector electrodes of said first and second transistors to said source of supply potential, said first and second transistors being normally in a conducting state in the absence of said electrical signal, the in-phase form of said electrical signal being applied to the base electrode of said first transistor thereby initially causing increased conduction in said first transistor and the charging of its associated capacitor, the phase-inverted form of said signal being concurrently applied to the base electrode of said second transistor, thereby causing said second transistor to cease conduction, the occurrence of the peak absolute amplitude of said electrical signal resulting in the return of said first transistor to its normal state of conduction and the subsequent discharge of its associated capacitor, whereby said first transistor is driven to a nonconducting state, both said first and second transistors being nonconductive at this time, a voltage level transition appearing across said impedance means in response to the occurrence of the peak absolute amplitude of said electrical signal.

7. A signal peak detection system as defined in claim 6 further including a third transistor having an emitter, a collector and a base electrode, impedance means connecting the common collector electrodes of said first and second transistors to the base of said third transistor whereby said voltage level transition is applied to said third transistor, the emitter electrode of said third transistor being connected to ground potential, the collector electrode of said third transistor being coupled to the base electrodes of said first and second transistors, impedance means coupling the collector of said third transistor to said source of supply potential, the signal appearing across said last mentioned impedance means being the output signal of said signal peak detection system.

8. A signal peak detection system as defined in claim 7 wherein said first, second and third transistors are all of the same conductivity type.

9. A signal peak detection system as defined in claim 7 including means for utilizing said output signal of said peak detection system.

References Cited

UNITED STATES PATENTS

| | | | |
|---|---|---|---|
| 3,187,199 | 6/1965 | Chur | 307—235 |
| 3,231,824 | 1/1966 | Drapkin | 307—235X |
| 3,375,450 | 3/1968 | Ayres et al. | 328—150 |

STANLEY D. MILLER, Primary Examiner

U.S. Cl. X.R.

307—261, 264; 328—116, 150